Figure 1A:
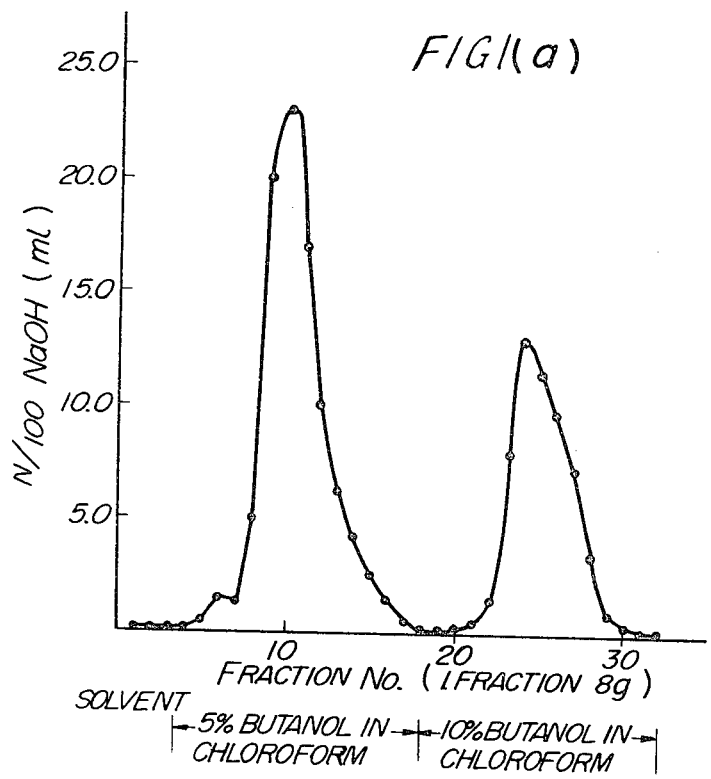

United States Patent
Ueno et al.

[15] 3,663,368
[45] May 16, 1972

[54] METHOD FOR REMOVING LEVULINIC ACID BY MICROORGANISMS

[72] Inventors: Takahiro Ueno; Michio Harada, both of Takasago-shi, Japan

[73] Assignee: Kikkoman Shoyu Co., Ltd., Noda-shi, Japan

[22] Filed: Dec. 12, 1968

[21] Appl. No.: 783,202

[30] Foreign Application Priority Data

Dec. 18, 1967 Japan...................................42/80632
Oct. 1, 1968 Japan...................................43/70785

[52] U.S. Cl..........................................195/4, 99/14, 99/17, 99/140, 195/2
[51] Int. Cl. ..............................................................C12b 1/00
[58] Field of Search....................99/14, 17, 98; 195/2, 4, 29, 195/30

[56] References Cited

UNITED STATES PATENTS 3,364,034  1/1968  Hoersch et al............................99/98

Primary Examiner—A. Louis Monacell
Assistant Examiner—William Andrew Simons
Attorney—Cushman, Darby & Cushman

[57] ABSTRACT

A method for removing levulinic acid from a liquid containing levulinic acid which comprises adding materials containing cells of microorganisms to a liquid containing levulinic acid, said materials containing cells of microorganisms having been obtained by culturing a microorganism having the ability of utilization of levulinic acid in said liquid. Microorganisms employed include *Arthrobacter simplex* ATCC 6946, *Brevibacterium linens* ATCC 21330, *Corynebacterium equi* ATCC 21329 and *Pseudomonas aeruginosa* ATCC 21328.

10 Claims, 2 Drawing Figures

INVENTORS
Takahiro Ueno
Michio Harada
BY Cushman, Darby & Cushman
ATTORNEYS

METHOD FOR REMOVING LEVULINIC ACID BY MICROORGANISMS

This invention relates to a method for removing levulinic acid from a liquid containing levulinic acid by the use of microorganisms which have the ability of utilization of levulinic acid.

Levulinic acid, which has a structural formula of $CH_3CO(CH_2)_2COOH$, can be obtained by heating and hydrolyzing sugars with acid.

The acid hydrolysate of edible protein such as soy protein and wheat gluten is used for the manufacture of seasonings. When the carbohydrate or the plant protein which contains carbohydrate is hydrolyzed with acid such as hydrochloric acid, levulinic acid is produced in the hydrolysate.

Levulinic acid degrades the flavor and taste of the hydrolysate and inhibits fermentation which is carried out to improve the quality of these hydrolysates.

We succeeded in isolating four strains of microorganisms which utilize levulinic acid as a sole source of carbon from a stock culture, soil, sewage and food. One of them was recognized as *Arthrobacter simplex* ATCC 6946, and the biological characteristics of the others were investigated according to the method described in Society of American Bacteriologists' "Manual of Microbiological Methods," McGraw-Hill Book Co. Inc., New York, 1957. By the study of the classification of the other three strains according to Bergey's classification described in "Bergey's Manual of Determinative Bacteriology," 7th edition, Williams and Wilkins Co., Baltimore, 1957, it was concluded that they belong to *Brevibacterium linens*, *Pseudomonas aeruginosa*, and *Corynebacterium equi*, respectively. The said three strains were deposited with the American Type Culture Collection under the following ATCC numbers:

*Brevibacterium linens* ATCC 21330
*Pseudomonas aeruginosa* ATCC 21328
*Corynebacterium equi* ATCC 21329

The present invention can be practiced according to the following two methods:

1. culturing the above-mentioned strains in a liquid containing levulinic acid
2. using cell preparations of strains in a liquid containing levulinic acid.

1. The culture of the above-mentioned strains in a liquid containing levulinic acid.

First of all the strains are precultured in a synthetic, semisynthetic or natural medium at a temperature of 20° – 40° C for 8 – 24 hours, i.e., seed culture. In order to remove levulinic acid from a liquid containing levulinic acid, the culture is carried out under aeration at a temperature of 20° – 40° C for 20 – 120 hours by addition of 0.5 – 2.0 percent (by volume) of the preculture of these strains. Thus all of the levulinic acid is consumed.

The concentration of levulinic acid contained in the culture liquid is desirably 3.0 percent (by weight) or less. It is desirable to keep the pH at 6.0 – 9.0, preferably at 7.2 – 7.6 at the beginning. The pH at 6.5 or less or 8.4 or more is not so suitable. If the pH becomes 5.5 or 10.0, levulinic acid is not consumed.

For the growth of these strains, it is suitable to contain nutrients such as nitrogen sources and organic and inorganic sources in the liquid. A carbon source except levulinic acid is also suitable. As nitrogen sources, $(NH_4)_2SO_4$, $NH_4H_2PO_4$, ammonium citrate, urea, peptone, meat extract and soybean meal are particularly preferred and $NH_4Cl$, $(NH_4)_2HPO_4$, ammonium tartarate, ammonium acetate, $NaNO_3$ etc. may be also employed. As inorganic components necessary for the growth of these strains, phosphate, magnesium salts and other salts may be included. As carbon sources, saccharides such as sucrose, lactose, glucose, etc. may be suitable.

Furthermore, growth promoting substances such as meat extract, yeast extract, corn steep liquor, etc. may be employed.

The amount of these nutrients to be added to the medium is preferably 0.05 – 0.3 percent (by weight).

But it is not necessary to add any nutrients to the acid hydrolysate of crude plant protein containing carbohydrates, and the concentration of hydrolysate should be controlled within a range of 0.5 – 2.0 percent of total nitrogen and 3 – 12 % of NaCl.

2. The use of cell preparations of strains in a liquid containing levulinic acid In the case of using cell preparations such as intact cells or their dry matters, no addition of nutrients to a liquid containing levulinic acid is necessary. The intact cells are prepared by washing cells obtained by centrifugalization or filtration of the broth with water or buffer solution. The amount of cells to be added is about 10 – 200 percent by weight based on levulinic acid.

The solution obtained by shaking at pH 6.0 – 9.0 for 2 – 5 hours contains neither levulinic acid nor formic acid produced by acid hydrolysis of carbohydrate.

Figure 1B:
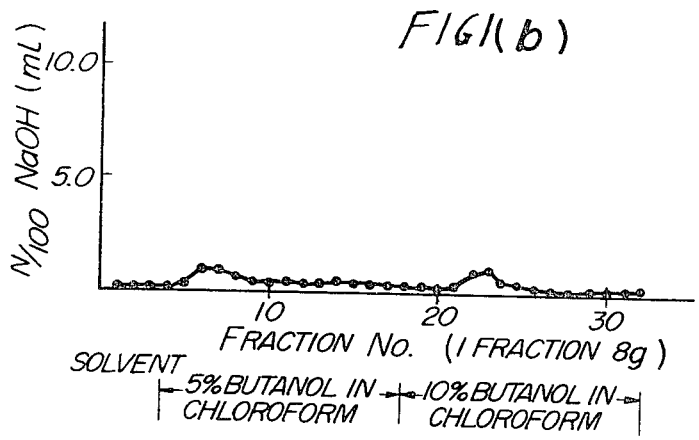

The effects of the present invention are shown in FIG. 1 (*a*) and FIG. 1 (*b*). In the accompanying drawing, FIG. 1 (a) and FIG. 1 (b) show contents of levulinic acid and formic acid in acid hydrolysates of defatted soybean (total nitrogen 1.0 %, NaCl 10 %, pH 7.5) before and after *Brevibacterium linens* ATCC 21330 is cultured at 30° C for 60 hours, respectively. In order to determine the content of the above two acids, conc. $H_2SO_4$ is added to the hydrolysates until pH is 2.0, the hydrolysates are extracted with ether every after a definite time and the acids are determined by chromatography with silica gel. Vertical line shows ml of a N/100 NaOH solution required for neutralization. The first peak is of levulinic acid and the second formic acid. From (*b*), it is seen that levulinic and formic acids are greatly reduced after culturing the microorganism.

EXAMPLE 1

0.1 % of ammonium sulfate, 0.3 % of potassium dihydrogen phosphate, 0.03 % of magnesium sulfate (so-called epsom salts) and 0.05 % of yeast extract were added to an aqueous solution containing 1.0 % of levulinic acid and the pH of this solution was adjusted to 7.2 with a NaOH solution. Fifty ml. of this solution were poured into a 500 ml. shaking flask and sterilized. One ml. of cultured liquid obtained by culturing *Arthrobacter simplex* ATCC 6946 with shaking at 30°C for 18 hours in a bouillon medium was added to the flask. The above bouillon medium consists of 10 g. of beef extract, 10 g. of peptone, 5.0 g. of sodium chloride and 1.0 l of distilled water.

Thereafter, cells were centrifugalized and the concentration of levulinic acid in the supernatant was determined with colorimetric determination using vanillin in the presence of concentrated sulfuric acid or using hydrazine. As a result, no levulinic acid was found in the supernatant.

EXAMPLE 2

*Pseudomonas aeruginosa* ATCC 21328 was previously cultured in the same medium as described in Example 1 at 30° C for 18 hours with shaking to obtain intact cells.

0.05 g. (dry weight) of the intact cells were added to 50 ml. of a M/10 phosphate buffer solution (pH 7.0) containing 0.3 percent of levulinic acid.

Shaking was carried out at 30° C for 4 hours. After the same treatment as in Example 1, no levulinic acid was found.

EXAMPLE 3

Defatted soybeans were hydrolyzed in aqueous hydrochloric acid (mol ratio of hydrochloric acid and total nitrogen is 1 : 1) at 100° C for 100 hours and neutralized to pH 7.5 with $Na_2CO_3$. The concentration of total nitrogen and NaCl of this hydrolysate was adjusted to 1.5 percent and 10 percent, respectively.

Two liters of cultured liquid obtained by culturing *Brevibacterium linens* ATCC 21330 with shaking at 30° C for 18 hours in the same bouillon medium as in Example 1 were added to the 200 liters fermentor containing 100 liters of hydrolysate as mentioned above.

After carrying out the culture under aeration at 30° C for 72 hours, the cells were filtered off and then the pH of filtrate was adjusted to 5.0 with a HCl solution. Two liters of cultured liquid of *Saccharomyces rouxii* in rice koji extract were added to this culture filtrate. Fermentation was carried out statically under aerobic conditions at 30° C for 5 days, and 90 liters of well-mellowed seasoning liquid which contained neither levulinic acid nor formic acid were obtained.

EXAMPLE 4

Crude wheat gluten was hydrolyzed according to the same procedure as in Example 3 to obtain hydrolysate of gluten. The concentration of total nitrogen and NaCl of this hydrolysate was adjusted to 1.0 percent (0.28 percent of levulinic acid content), and 5.0 percent, respectively, and the pH thereof 7.5 with a $Na_2CO_3$.

Two liters of cultured liquid obtained by culturing *Corynebacterium equi* ATCC 21329 with shaking at 30° C for 18 hours in the same bouillon medium as in Example 1 were added to the 200 liters fermentor containing 100 liters of hydrolysate as mentioned above.

Culture was carried out with aeration at 30° C for 60 hours.

Thereafter, the pH of this broth was adjusted to 5.0 with a HCl solution and cells were filtered off. Then the supernatant was concentrated in vacuo to obtain 15 liters of a flavorful seasoning solution which contained neither levulinic acid nor formic acid.

What we claim is:

1. A method for removing levulinic acid from a liquid containing levulinic acid which is characterized by adding materials containing cells of microorganisms to a liquid having a pH of 6.0–9.0. containing levulinic acid, said materials containing cells of microorganisms having been obtained by culturing a microorganism having the ability of utilization of levulinic acid in said liquid.

2. A method according to claim 1, wherein the microorganism is *Arthrobacter simplex* ATCC 6946, *Brevibacterium linens* ATCC 21330, *Corynebacterium equi* ATCC 21329 or *Pseudomonas aeruginosa* ATCC 21328.

3. A method according to claim 2, wherein preculture of said microorganism is added to said liquid containing levulinic acid in an amount of 0.5 – 2.0 percent (by volume) and cultured at 20° – 40° C for 20 – 120 hours under aerobic conditions.

4. A method according to claim 2 wherein the pH is between 6.5 and 8.4.

5. A method according to claim 4 wherein the pH is between 7.2 and 7.6.

6. A method according to claim 1, wherein said materials containing cells of microorganisms are seed-cultured liquid, intact cells or dried matters.

7. A method according to claim 6, wherein said intact cells or said dried matters are added to said liquid containing levulinic acid in an amount of 10 – 200 percent (be weight) based on levulinic acid in said liquid and shaken at 20° 40° C for 2 – 5 hours.

8. A method according to claim 1, wherein concentration of levulinic acid in said liquid containing levulinic acid is 3 percent by weight or less, the pH thereof being adjusted to 6.0 – 9.0.

9. A method according to claim 1 wherein said liquid containing levulinic acid is an acid hydrolysate of carbohydrate.

10. A method according to claim 9 wherein said acid hydrolysate is acid hydrolysate of a mixture of carbohydrate and crude protein material.

* * * * *